(12) United States Patent
Shukla et al.

(10) Patent No.: US 9,817,967 B1
(45) Date of Patent: Nov. 14, 2017

(54) INTEGRATED ROBOTICS AND ACCESS MANAGEMENT FOR TARGET SYSTEMS

(71) Applicant: ACCENTURE GLOBAL SOLUTIONS LIMITED, Dublin (IE)

(72) Inventors: Sanjeev Shukla, Croydon (GB); Gaurav Tandon, Slough (GB); Rexall E. Thexton, Neshanic Station, NJ (US); Neha Joshi, Forest Hills, NY (US); David Michael Parker, Hampshire (GB); Avinash Ramesh, London (GB); Krishna M. Dasari, Frisco, TX (US); Parvathy Ramakrishnan, Edison, NJ (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/406,559

(22) Filed: Jan. 13, 2017

(51) Int. Cl.
| | |
|---|---|
| H04L 29/06 | (2006.01) |
| G06F 17/50 | (2006.01) |
| G06F 21/52 | (2013.01) |
| G06F 21/45 | (2013.01) |
| G05B 19/042 | (2006.01) |

(52) U.S. Cl.
CPC .............. *G06F 21/52* (2013.01); *G06F 17/50* (2013.01); *G06F 21/45* (2013.01); *H04L 63/10* (2013.01); *G05B 19/042* (2013.01); *G05B 2219/24158* (2013.01); *G05B 2219/39371* (2013.01); *G06F 2221/031* (2013.01)

(58) Field of Classification Search
CPC ................................. H04L 63/10; G06F 17/60
See application file for complete search history.

(56) References Cited

U.S. PATENT DOCUMENTS

| | | | | |
|---|---|---|---|---|
| 6,085,312 A | * | 7/2000 | Abdallah | G06F 9/3001 712/208 |
| 6,182,131 B1 | * | 1/2001 | Dean | G06F 21/31 709/222 |
| 2002/0083012 A1 | * | 6/2002 | Bush | G06Q 20/3821 705/76 |
| 2002/0124184 A1 | * | 9/2002 | Fichadia | G06Q 10/10 726/4 |
| 2003/0225662 A1 | * | 12/2003 | Horan | G06Q 40/06 705/36 R |
| 2003/0233326 A1 | * | 12/2003 | Manley | G06Q 20/10 705/42 |
| 2006/0184649 A1 | * | 8/2006 | Chakravarty | G06F 21/31 709/220 |
| 2008/0282191 A1 | * | 11/2008 | Branam | H04L 12/2812 715/810 |
| 2011/0004882 A1 | * | 1/2011 | Vengerov | G06F 9/5033 718/103 |
| 2013/0073079 A1 | * | 3/2013 | Ouchi | B25J 9/1656 700/245 |
| 2016/0050213 A1 | * | 2/2016 | Storr | G06F 21/32 726/6 |
| 2016/0059412 A1 | * | 3/2016 | Oleynik | B25J 9/163 700/257 |

* cited by examiner

*Primary Examiner* — Jason C Chiang
(74) *Attorney, Agent, or Firm* — Mannava & Kang, P.C.

(57) ABSTRACT

An access management robot facilitation system facilitates a robot to execute access management tasks on a target system.

17 Claims, 6 Drawing Sheets

Table 300

| LoginId | Operation | Status | FirstName | LastName | FullName | Password | UserStatus | Remarks |
|---|---|---|---|---|---|---|---|---|
| TestOpenAM001 | DeleteUser | Failed | Alpha | Anderson | Alpha Anderson | Test123!! | Active | Multiple records found for Full Name "Alpha Anderson" |
| TestOpenAM002 | CreateUser | Exception | Beta | Bush | Beta Bush | Test123!! | Active | Name already exists TestOpenAM002 |
| TestOpenAM015 | DeleteUser | Completed | Alpha | Anderson | Alpha 15 Anderson | Test123!! | Active | |
| TestOpenAM016 | CreateUser | Completed | Beta | Bush | Beta Bush | Test123!! | Active | |
| TestOpenAM017 | CreateUser | Exception | Alpha | Anderson | | Test12 | Active | One or many mandatory fields are blank |
| TestOpenAM018 | CreateUser | Exception | Beta | Bush | Beta Bush | Test123!! | Active | Minimum password length is 8. |
| TestOpenAM021 | CreateUser | Completed | Alpha | Anderson | Alpha Anderson | Test123!! | Active | |
| TestOpenAM022 | CreateUser | Completed | Beta | Bush | Beta Bush | Test123!! | Active | |
| TestOpenAM023 | CreateUser | Failed | Alpha | | Alpha Anderson | Test123!! | Active | One or many mandatory fields are blank!Operaion on T |
| TestOpenAM024 | CreateUser | Failed | Beta | Bush | Beta Bush | Test12 | Active | Minimum password length is 8.!Operation on TestOpen |
| TestOpenAM088 | CreateUser | Completed | Alpha | Anderson | Alpha88 Anderson | Test123!! | Active | |
| TestOpenAM089 | CreateUser | Completed | Alpha | Anderson | Alpha 15 Anderson | Test123!! | Active | |
| TestOpenAM090 | CreateUser | Completed | Alpha | Anderson | Alpha 15 Anderson | Test123!! | Active | |
| TestOpenAM091 | CreateUser | Exception | Alpha | Anderson | Alpha 15 Anderson | test1234 | Active | Failed to Perform step 1 in Navigate Stage "Click Cance |
| TestOpenAM092 | DeleteUser | Failed | | | Aaren Atp | | | TestOpenAM092 not found.!Operation on TestOpenAM |

FIG. 3

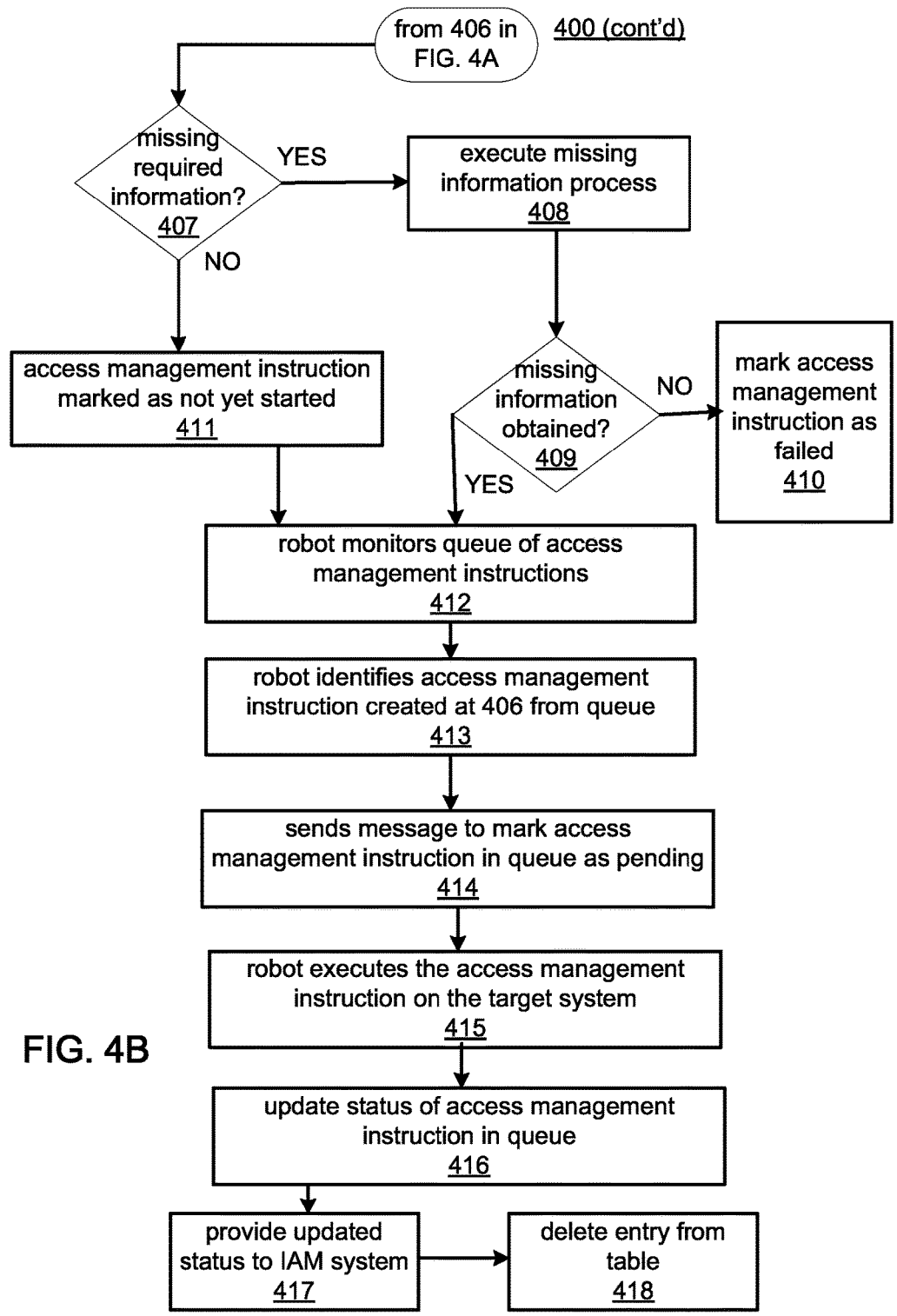

INTEGRATED ROBOTICS AND ACCESS MANAGEMENT FOR TARGET SYSTEMS

BACKGROUND

In information technology, identity and access management commonly includes managing user accounts on various systems. These systems may include different applications, such as a database application, a customer relationship management (CRM) application, an accounting application, a factory automation application, etc. Often system administrators are responsible for managing the lifecycle of user accounts for these systems locally, on the system as users join, leave or change their roles within an organization. The system administrators may create user accounts, delete user accounts, modify privileges, and so on.

In many instances, the systems for which user accounts are being managed have non-standard and manual processes and mechanisms for managing their user accounts. A system may have a well-defined process for account and access management but there is no common well-defined process or interface across different systems for account and access management. Thus, in order to manage user accounts on these systems, organizations commonly rely on a help desk to manage the user accounts. Typically, when a user account is to be created, a request is raised either through an access request management system, email, or phone, and a ticket is generated to create the user account. Then, approvals are obtained via email or an approval workflow in the access request management system to create the user account, and then the ticket may be placed in a queue. Then, a system administrator, such as a help desk administrator, may eventually be assigned to the ticket, and the system administrator creates the user account in the system.

Help desks are an inefficient and costly solution for managing user accounts. In many instances, larger operational teams are needed to run the help desk, which in addition to being costly, are fraught with manual errors, inefficiencies, etc. Also, as the organization grows, expensive developers may be required to keep the help desk systems relevant and running. Furthermore, help desks are often not timely. A ticket may be generated to create a user account, but it may take multiple days or even a week to get the account created due to backlogs. Furthermore, users that are waiting for access to systems may be left unable to perform their tasks and duties which require use of the systems.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

FIG. 3 illustrates a robot instruction queue, an embodiment;

FIGS. 4A-B illustrate a method, according to an embodiment; and

DETAILED DESCRIPTION

Figure 1:
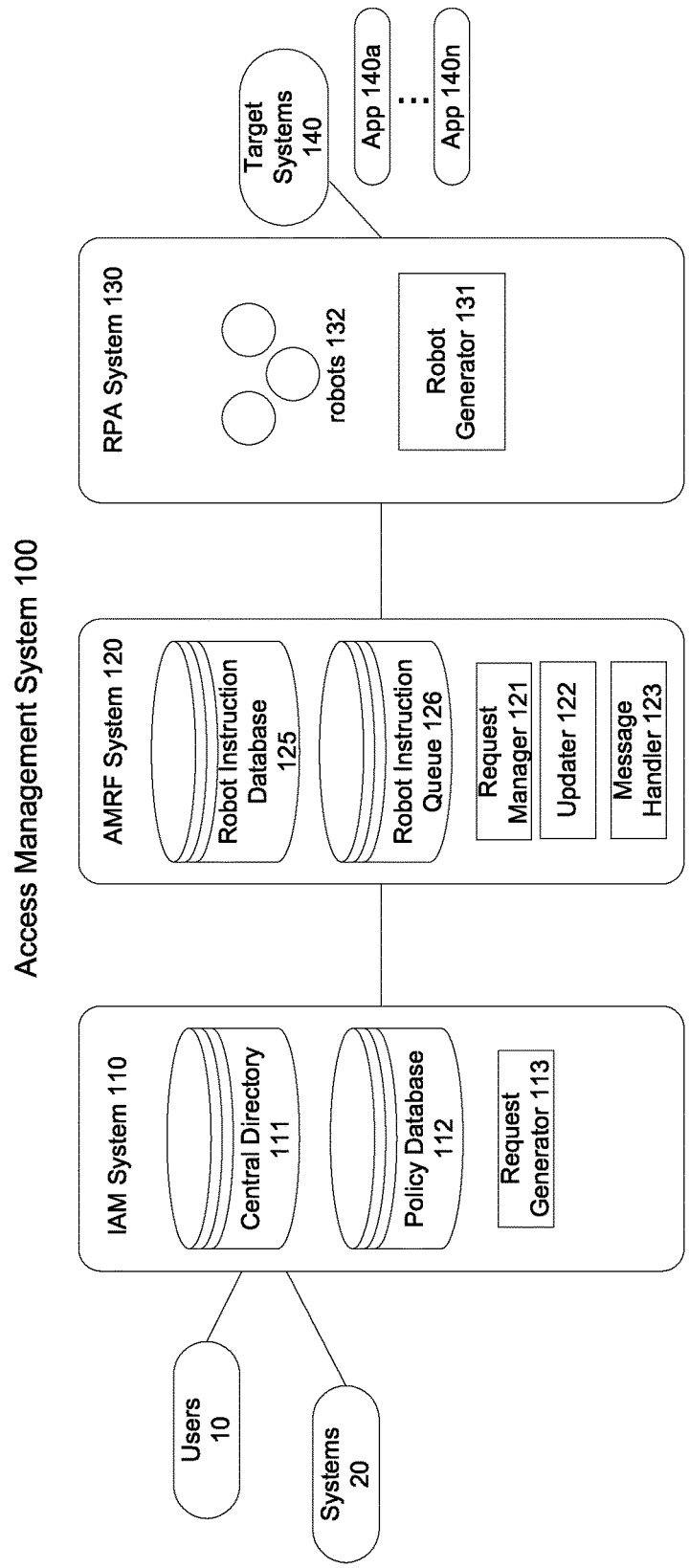
FIG. 1 illustrates an access management system, according to an embodiment.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the examples. Furthermore, the examples may be used together in various combinations.

According to an embodiment of the present disclosure, robots configured through a robotic process automation (RPA) system automate tasks for managing access to target systems. A robot may include computer software that performs one or more tasks for which it is trained. Examples of the tasks may include managing user accounts on the target systems, such as creating, deleting or modifying user accounts. The tasks may be associated with controlling user access to a target system or to one or more resources of the target system. The tasks may include associating user rights and restrictions with an electronic user identity. The access control may be based on policies defining which devices and users are allowed on a network and what users are allowed to accomplish, depending on device type, location, roles, and other factors. The target systems may include applications or any type of system whereby access to the system by users or other systems is to be managed.

According to an embodiment, the robots may execute composite requests. For example, a single request may be received that requires multiple tasks to be performed to achieve a desired outcome of the request. Thus, the received request may be a composite request that requires the performance of multiple tasks to achieve the desired outcome. Furthermore, the composite request may require that a series of tasks be performed in a particular sequence to achieve the desired outcome. The system may unbundle a composite request to identify the series of tasks to be performed, and one or more robots may perform the series of tasks in a particular order.

An access management system may include an access management robot facilitation system that can provide instructions to a robot to perform a task for managing access to a target system. For example, the access management robot facilitation system may receive a request associated with managing access to a target system, and the request may be from an identity and access management (IAM) system or another system like a service management system or a helpdesk management system. The access management robot facilitation system can generate instructions based on the request to provide to the robot to carry out the task associated with the request for managing access to the target system. The access management robot facilitation system is referred to as the AMRF system below.

The access management robot facilitation system uses robots that automate complex and important processes by mimicking human actions that are typically performed manually. Furthermore, the access management robot facilitation system lowers operational costs through automated triggering of access management tasks and removal of manual intervention required for event notification and process execution by robots.

FIG. 1 illustrates an access management system 100, according to an embodiment. The access management system 100 may include one or more computer platforms. The computer platforms include computer hardware, such as processors, memory, storage devices, network interfaces, etc. The computer platforms may include servers or other types of computer systems that execute machine readable instructions to perform the operations of the access management system 100 described herein. The access management system 100 includes IAM system 110, AMRF system 120, and RPA system 130. The IAM system 110 facilitates the management of electronic identities for users. The IAM system 110 may include a central directory 111 of electronic identities of individuals of an organization. The central directory 111 may be a database or another type of data storage system including a data storage device. The credentials may include attributes of the individuals, such as employee identifier (ID), job title, geographic, business unit ID, etc. For example, when an employee joins an organization, credentials for the new employee are created and stored in the central directory 111. The IAM system 110 may include a policy database 112 that stores policies for the organization that may be related to access management. For example, the policies may specify target systems of target systems 140 that an employee is supposed to be able to access based on their role, department or position. The target systems 140 may include applications 140a-n or any type of system whereby access to the system by users or other systems is to be managed.

The IAM system 110 may receive requests from users 10 or systems 20 to perform access management tasks. The requests, if approved, may be performed by the system 100. For example, a request may be created by a user to create a new account for a new employee in an accounting application, or may be sent from an automated system to create the new account for the new employee. The request may need to be approved by one or more individuals based on a policy stored in the policy database 112. The IAM system 110 may obtain necessary approvals in order to perform the task. The approvals may be performed on IAM system 110 through a self-service user interface or be sent via email or in some other form to the IAM system 110 or to the AMRF system 120. For example, approvals are sought and accepted through emails in an AMRF shared mailbox. The AMRF system 120 can read email approvals and generate instructions for the robot to proceed with user access creation. So approvals may be localized at the IAM system 110 or approval feedback could be sent to the AMRF system 120.

The IAM system 110 may include a request generator 113 to generate access management requests. In an example, if a request received from one of the users 10 or one of the systems 20 is approved, the request generator 113 may generate an access management request for the approved request. The access management requests, for example, are for performing access management tasks for managing access to target systems 140. For example, an access management request may be for creating, modifying or deleting an account on a target system. The access management request may include attributes of the individual for which the task is being performed. The attributes may be stored in the central directory 111 and retrieved from the central directory 111 to include in the access management request. The access management request may identify the task to be performed, such as create account, and may identify the target system on which the task is to be performed. The access management request may be in the form of an email, a help desk ticket, an Extensible Markup Language (XML) message, a CSV (delimited flat file) file or in another format. Existing IAM systems, such as provided by SailPoint™, Oracle™ or Forgerock™, may be used for the IAM system 110.

The AMRF system 120 receives access management requests from the IAM system 110, and stores the requests and creates instructions for a robot to execute the requests. The AMRF system 120 may include a request manager 121 for translating the requests to instructions that can be executed by a robot and storing the instructions, also referred to as the robot instructions. The AMRF system 120 may include a robot instruction database 125 to store the robot instructions. The AMRF system 120 may include robot instruction queue 126 for storing the status of robot instructions. The status may indicate whether a robot instruction is not yet started, pending, completed, failed or exception (e.g., a predetermined or unknown exception is encountered during execution of the robot instruction). Other information pertaining to the robot instructions may be stored in the robot instruction queue 126. The robot instruction queue 126 may include a data structure that stores the information for the robot instructions. The data structure may include database tables or documents (XML, JavaScript Object Notation (JSON), etc.) in the robot instruction database 125 or may include a data structure separate from the robot instruction database 125.

The AMRF system 120 may include an updater 122 that updates the status of robot instructions in the robot instruction queue 126. For example, robot instructions may be not yet started if they are waiting to be executed by a robot, or may be active or pending if they are currently being executed, or may be completed if the robot executed the instruction. The updater 122 may also update whether an instruction successfully completed or failed. A message handler 123 handles incoming and outgoing messages pertaining to robot instructions. Outgoing messages may include messages to the IAM system 110 indicating the status of requests. For example, the IAM system 110 may request the status of a robot instruction and the message handler 123 sends the status to the IAM system 110. The AMRF system 120 may push status information when a change of status occurs for a robot instruction occurs.

RPA system 130 may include a robot generator 131 and robots 132. The robot generator 131 may generate the robots 132 based on processes and inputs and outputs determined for steps of the processes. For example, in a design phase, processes may be created by a user in an editor, such as in the form of flow charts, and include attributes for steps of the flow chart. In an example, the processes may be created according to a Unified Modeling Language (UML) standard, and stored in the RPA system 130. In a learning phase, a robot learns the behavior of a target system, and field elements on the target system are identified and configured, for example, as an object. After the learning is completed, the robot is considered to be generated. After being generated, a robot can independently navigate through the target system and execute actions on the target system.

In an example, a robot is created to create a user account in a target system comprised of a CRM application. Typically, to manually create the user account, a system administrator may have to login to the CRM application through an internal portal, enter the system administrator login ID and password at a graphical user interface (GUI) login page, and select one or more options and enter user data for creating the user account. The robot is programmed to create a user account, for example, by entering these steps through the editor. The robot generator 131 receives the steps and trains the robot to create user accounts according to the steps, which mimic the manual steps. One or more robots, e.g., robots 132, may be created to perform access management tasks on the target systems 140. The target systems 140 may include different types of applications, such as a database application, a CRM application, an accounting application, a factory automation application, cloud applications, local applications, etc. In an example, the robot generator 131 may include RPA robot generation software, such as Blueprism™, Automation Anywhere™, UiPath™, or Fusion™ and other components not shown. A robot may be programmed to perform execute a particular access management instruction for a particular target system. The RPA system 130 may identify a robot of the robots 132 to execute a particular access management instruction based on the target system and the operation to be performed for the access management instruction.

Figure 2:
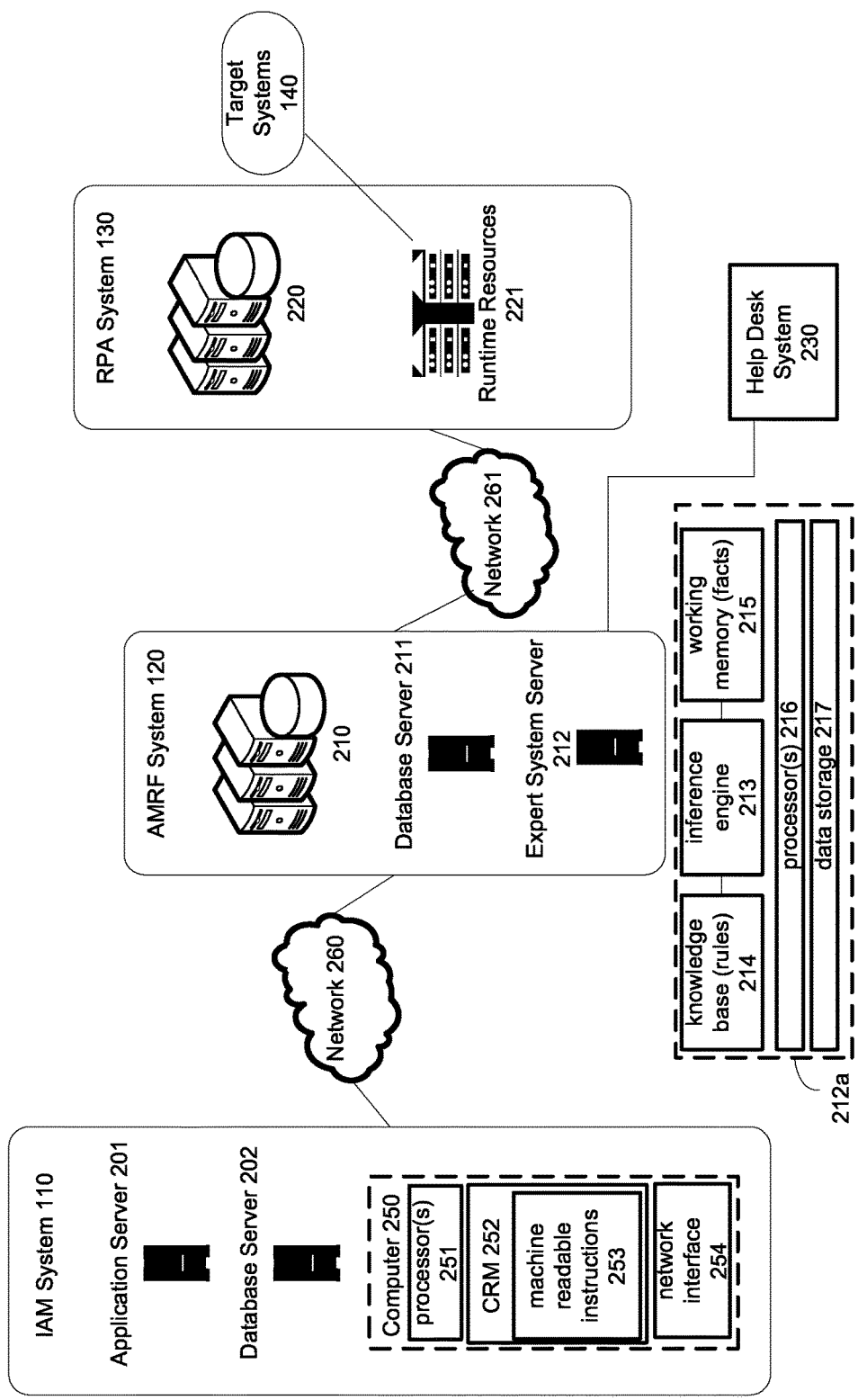
FIG. 2 illustrates a computer architecture of an access management system, according to an embodiment.

FIG. 2 illustrates examples of computing hardware architecture for the system 100. Although not shown additional hardware components may be used for the system 100. One or more processors may execute machine readable instructions stored in a non-transitory computer readable medium to perform the operations of system 100.

FIG. 2 also shows examples of the computer platforms for the IAM system 110, AMRF system 120, and RPA system 130. For example, the IAM system 110 may include one or more identity access management computers which may comprise an application server 201 that executes software for the IAM system 110, including the request generator 113, and may include a database server 202 for hosting databases for the central directory 111 and the policy database 112. Computer 250 shows an example of components that may be included in servers or any computer system that may be used in the system 100 to perform the operations described herein. For example, computer 250 may include one or more processors 251 that may execute machine readable instructions 253 stored on a non-transitory computer readable medium 252. The computer readable medium 252 may include hardware storage, such as memory, hard drives, etc. Although not shown, the computer 250 may include a network interface 254 to connect to a network, which may include a local area network, a wide area network, public network (e.g., Internet), private network, wired and/or wireless network. Networks 260 and 261 are shown as connecting IAM system 110, AMRF system 120 and RPA system 130. One or multiple networks may be used to connect these systems. Also, a network may be used by the robots 132 to access the target systems 140.

Similar to the IAM system 110, the AMRF system 120 may include one or more access management robot facilitation computers which may comprise servers 210 or other types of computer systems to host software for the AMRF system 120 and a database for the instruction database 125 and the robot instruction queue 126. In an example, a database server 211 may be used for the robot instruction queue 126.

The AMRF system 120 may include an expert system to manage the robot instruction queue 126 and perform other functions described herein. The expert system may be hosted by expert system server 212 or another type of computer system. The expert system server 212 may be a server of the servers 210. An architecture of the expert system is shown as 212*a* in FIG. 2. The expert system may include a computer system that emulates or acts with the decision making capabilities of human but the decision making is performed by inference engine 213 based on a knowledge base 214. Working memory 215 may store facts upon which a decision is made by the inference engine 213.

The inference engine 213 may be a rule-based engine. Rules for decision making may be stored in the knowledge base 214, which may include a database or another type of storage system. A set of facts about a received access management request or the state of the robot instruction queue 126 are determined and stored in the working memory 215. The inference engine 213 determines which rules are satisfied by the facts, prioritizes them, and executes the rule or rules with highest priority. As is known in the art, the rule-based inference engine 213 may perform forward chaining and/or backward chaining to determine the rule to apply. Forward chaining is reasoning from facts to the conclusion while backward chaining is from hypothesis to the facts that support this hypothesis. Examples of rule-based expert systems that perform forward chaining and/or backward chaining include CLIPS, ART and KEE. The inference engine 213 may apply machine learning for decision making processes. For example, the inference engine 213 may include classifiers or a neural network to make decisions based on facts in the working memory 215.

Some examples of decisions that may be made by the inference engine 213 may include determining whether a received access management request is a composite request, and identifying and responding to failed execution of robot instructions. In response to determining that a received access management request is a composite request, the inference engine 213 creates robot instructions in the robot instruction queue 126 for a series tasks to be executed by one or more of the robots 132 to execute the composite request. For example, rules or a classifier may be used to determine whether a received access management request is a composite request in order to facilitate execution of the series tasks for the composite request.

The inference engine 213 may identify robot instructions that failed to execute from the robot instruction queue 126 and determine whether a remedial operation can be performed to execute those robot instructions. For example, a robot may fail to execute an access management task on a target system because the robot cannot connect to the target system due to network connectivity failure or other reasons. The inference engine 213 may learn that particular failure messages, such as failed to connect, are indicative of connectivity failure to a target system and generate an alert to fix the connectivity problem. The inference engine 213 may identify other causes of failed execution of robot instructions, such as a change in user interface of a target system, and execute remedial actions to correct the failed executions. In an example, a remedial action may include re-training a robot to perform an access management task based on recorded desktop operations of a system administrator performed the access management tasks from their computer system.

The architecture 212*a* of the expert system may include software stored on a non-transitory computer readable medium, which may include the data storage 217 and executed by one or more processors 216. The software of the expert system may include software to perform operations for the inference engine 213, the knowledge base 214 and the working memory 215. The working memory 215 may include memory or another type of storage system. Also, the expert system may be connected to a help desk system 230. The expert system may send notifications to the help desk system 230 for instructions that failed to execute in the robot instruction queue 126. System administrators may access the help desk system 230 to identify failed instructions and perform remedial actions.

The RPA system 130 may include one or more servers 220 or other types of computer systems to host software for the AMRF system 120 and may include a database. In an example, runtime resources 221 are used to execute the robots 132. The runtime resources 221 may include processors, memory and other storage and network interfaces to interface to the target systems 140. The software for the robots 132, including the programmed processes, may also be stored in the runtime resources 221 and executed by the processors of the runtime resources 221.

According to an embodiment, the AMRF system 120 and the RPA system 130 may be a single system. For example, the RPA system 130 may have client-server architecture where robots 132 act as client to receive and process instructions from a central application server. The central application server may include the robot instruction queue 126.

As discussed above, the AMRF system 120 may receive requests from the IAM system 110 to perform access management tasks for the target systems 140, and create instructions that can be used by the robots 132 to execute the access management tasks specified in the requests. FIG. 3 shows an example of information that may be included in the instructions for the robots 132, i.e., the robot instructions. The information may be stored in a table 300. The robot instruction queue 126 may be comprised of the table 300. The table 300 may include fields for LoginID, Operation, Status, FirstName, LastName, FullName, Password, UserStatus, and Remarks. Although not shown, the table 300 may include other fields, such as a TargetSystem field that identifies the target system on which the access management task is to be performed. One or more of the fields may be mandatory. For example, if the field is empty, e.g., field value=null, for a mandatory field, then the request manager 121 of the AMRF system 120 may notify or otherwise provide feedback to the IAM system 110 to obtain the mandatory information. Some examples of mandatory fields may include LoginID, FullName, and Operation. The IAM system 110 may generate or retrieve the information from the central directory 111 and send it to the AMRF system 120.

In the table 300, the LoginID, FirstName, LastName, FullName, Password, and UserStatus are for a user of the target system for which the access management task is being performed, and the Operation and Status describe the access management task to be performed and the status of performing the task, respectively. For example, row 1 of the table 300 is for a robot instruction to delete a user account from the OpenAM™ application, which is the target system for this access management task. The AMRF system 120 enables performance of automated access management tasks on OpenAM™ by providing instructions to the robots 132 through the AMRF system 120 to perform the access management tasks. Row 1 of the table 300 shows information that may be included in instructions, such as a robot instruction to delete a user account from the OpenAM™. The user's name for the account that is to be deleted is Alpha Anderson, and the LoginID and Password for this user are TestOpenAM001 and Test123!!, respectively. The robot executed the instruction, and updated the status to failed because multiple records were found for the same user name of Alpha Anderson. The Remarks field may be populated by the robot with a reason for the failed instruction execution. Other examples of instruction information is also shown in the table 300. Examples are shown for instructions that have a status of Exception or Completed. The status field may be changed to Exception if the robot is programmed to identify and handle an exception. For example, row 2 in table 300 is marked as an exception because when the robot tried to create a user having a login ID of TestOpenAM002 in the OpenAM™ application, a message was generated by the OpenAM™ application that the login ID of TestOpenAM002 already exists (e.g., currently being used) in the OpenAM™ application. The robot may update the remarks field based on the error encountered during the exception handling. The exception handling may simply be to provide notification of an error encountered for the exception handling, or may be more complex, such as to perform a remedial task. The robot may be programmed to handle a plurality of exceptions. Other examples of exceptions are shown in table 300, such as one or more mandatory fields are blank, password length less than 8 characters, etc. Although not shown, other examples of the status may be pending or in progress if the access management task is currently being performed, or not yet started if an instruction is waiting to be executed by a robot. The status and remarks in the table 300 may be updated by the robot, or updater 122 of AMRF system 120 may receive status information and remarks from the robot and update the table 300. The status may be sent to the IAM system 110 from the AMRF system 120 or queried by IAM system 110.

Figure 4A:
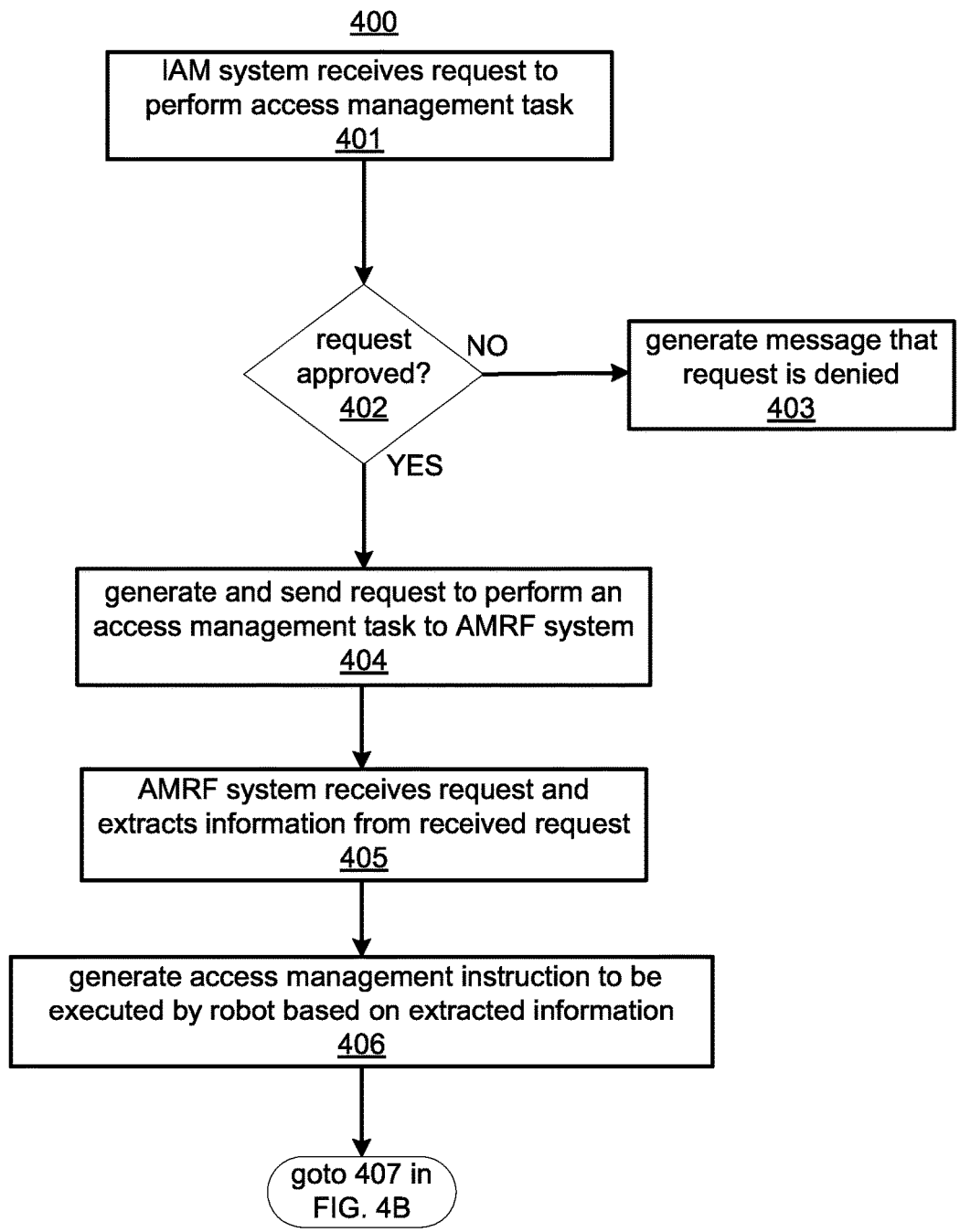

FIGS. 4A-B illustrates a method 400, according to an embodiment. The method 400 may be performed by the system 100. At 401, the IAM system 110 receives a request to perform an access management task. For example, a user may submit a request to the IAM system 110 via a request portal or may send a message to the IAM system 110 with the request. The request may include a request to create, modify or delete a user account on a target system of the target systems 140.

At 402, the IAM system 110 determines whether the request is approved. For example, policies may specify which target systems a user is authorized to access based on their department, and the IAM system 110 may determine whether the user is authorized to access a target system based on the policy in order to determine whether to approve a request to create a user account on the target system. Also, approval from authorized personal may be required to approve the request.

At 403, if the request is not approved, a message may be generated that the request is denied and may indicate why the request is denied, such as failure to obtain approval from authorized personal. The message may be sent to the user submitting the request.

At 404, if the request is approved, the IAM system 110 generates a request to perform an access management task based on the request received at 401, and sends the request to the AMRF system 120. The IAM system 110 may send requests to a predetermined network address or uniform resource locator of the AMRF system 120. In an example, the IAM system 110 may send the request to a mailbox, a service interface or a request staging database of the AMRF system 120 to add a new entry in the table 300 for the request. The request may include information that describes the access management task to be performed. In an example, the request may be an electronic ticket, email or may be in a predetermined Extensible Markup Language (XML) format, flexible JSON or may be in another form. Examples of information included in the request are shown in table 300 in FIG. 3.

At 405, the AMRF system 120 receives the request from the IAM system 110 and extracts information from the received request. For example, the AMRF system 120 parses the received request to identify information for predetermined fields.

At 406, the AMRF system 120 generates an access management instruction to be executed by a robot based on the extracted information. For example, the AMRF system 120 may create an entry in the table 300 shown in FIG. 3 for the instruction that includes the extracted information.

Instead of the table 300, another type of data structure may be used to store the instructions.

At 407, the AMRF system 120 determines whether the access management instruction is missing required information, such as information for predetermined mandatory fields. For example, the AMRF system 120 populates the fields of the table 300 and determines if any of the mandatory fields have a value=null. At 408, if the access management instruction is missing required information, the AMRF system 120 executes a missing information process to obtain the required information. The missing information process may include sending a message to the IAM system 110 indicating that the request is missing required information and may identify the required information that is missing. The AMRF system 120 may attempt to obtain the missing information. For example, the IAM system 110 may include the central directory 111 of electronic identities of individuals of an organization and their credentials, as discussed with respect to FIG. 1. The AMRF system 120 may query the central directory 111 for missing information using some information extracted from the request at 406. For example, the FullName may be extracted at 405, and used in a query to retrieve UserStatus or other information from the central directory 111 for the user identified by the FullName extracted at 405. At 409, a determination is made as to whether the missing information is obtained. If the missing information is not obtained, the instruction is marked as failed at 410, such as setting the status field to failed for the access management instruction in the table 300. For example, the access management instruction may be initially marked as exception in the status field of the table 300 while the missing information process is performed at 408. If the missing information cannot be obtained through the missing information process (such as within a predetermined period of time), then the access management instruction may be marked as failed in the status field of the table 300 at 410. The remarks field may be populated with information pertaining to why the access management instruction failed, such as unable to obtain required information. At 411, if the access management instruction has all the required information, the access management instruction is marked as not yet started in the status field of the table 300.

At 412, a robot of the robots 132 monitors a queue of access management instructions in the AMRF system 120. The queue may include access management instructions in the table 300 that are not yet started. Monitoring may include querying the AMRF system 120 for access management instruction instructions in the table 300 that have a status of not yet started. One or more of the robots 132 may monitor the queue of access management instructions, and the access management instructions may be executed in an order determined by an instruction execution policy. For example, an instruction execution policy may specify to execute the oldest instruction, or an instruction execution policy may specify priorities for executing instructions based on the target system that the instruction is to be executed or based on the department or role of a user associated with the instructions. For example, accounts for executives may be created before accounts for other users.

At 413, the robot identifies the access management instruction created at 406 from the queue for execution, and at 414, sends a message to the AMRF system 120 to mark the access management instruction in queue, e.g., the table 300, as pending in the status field. The message may include an operation request to modify the entry in the table 300 for the access management instruction to change its status to pending.

At 415, the robot executes the access management instruction on the target system specified in the access management instruction. For example, the robot logs into the target system specified in the access management instruction. The robot may login as a system administrator, according to its programming, to perform the access management task specified in the access management instruction. The robot performs the management task specified in the access management instruction, such as creating a user account for a user specified in the access management instruction. The robot may mimic the actions of a system administrator to perform the access management task. For example, the robot accesses a portal for the target system. The portal may include a login page. The robot logs in as a system administrator. To create the user account, the robot selects an option in the portal to create an account, and performs the operations through the portal to create the user account.

At 416, the robot updates the status of the access management instruction in the queue, such as table 300, based on the performance of the operations to execute the access management task specified in the instruction. For example, the robot may send a table update instruction to the AMRF system 120 to update the status in the entry in the table 300 for the performed access management instruction. The status field may be updated based on whether the access management instruction was successfully completed, failed or whether an exception was encountered. The remarks field may be updated to provide explanation of an exception or a failed execution.

At 417, the updated status is provided to the IAM system 110. For example, the AMRF system 120 determines that the status is updated in the table 300, and sends a notification message including the new status to the IAM system 110. The notification message may include additional details from the entry for the instruction in the table 300, including information in the remarks field if populated. At 418, the IAM system 110 may delete the entry from the table 300 for the instruction after receiving the updated status. For example, the IAM system 110 may send an operation request message to the AMRF system 120 to delete the entry from the table 300 for the instruction after receiving the updated status.

The IAM system 110 may also interact with a system administrator to remediate failed access management instructions or access management instructions that encountered an exception. For example, if the updated status was failed or exception, then the IAM system 110 may send a message, such as an email, text message or an instant message, to a system administrator to take remedial action. The message may be sent to the help desk system 230 so a system administrator can respond to the failed access management instruction. The message may include information from entry in the table 300 for the instruction, including remarks. The system administrator can then take remedial action, such as deleting multiple records for the same user, populating the central directory 111 with mandatory information for a particular user, etc. Then, if needed, the IAM system 110 may generate a new request to be sent to the AMRF system 120 to execute the access management instruction for the failed access management task, and the access management instruction should be able to be successfully completed by a robot.

Figure 5:
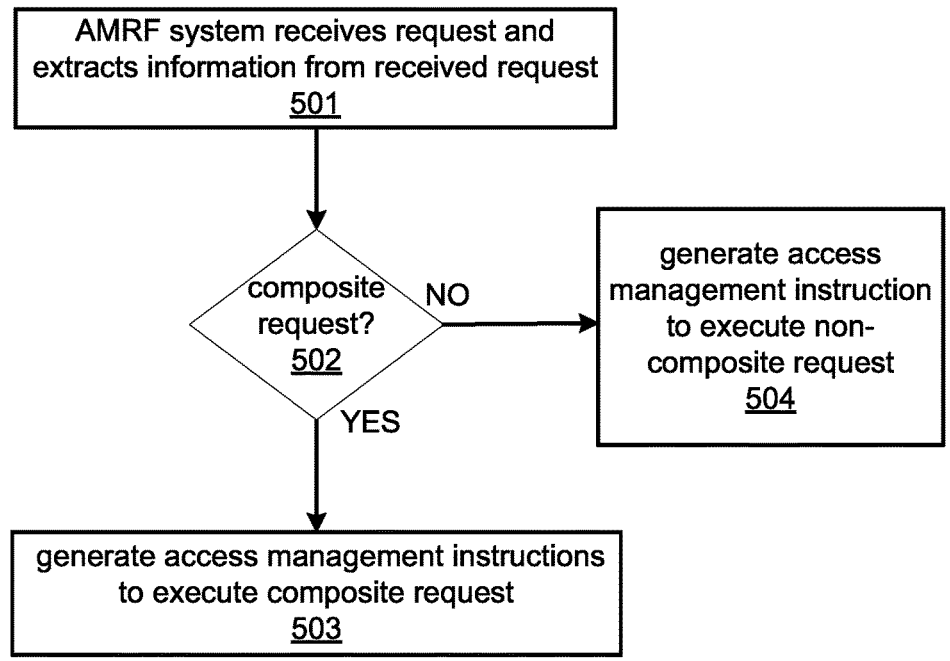
FIGS. 5-6 illustrate additional methods, according to embodiments.

FIG. 5 illustrates a method 500 for executing an access management request. The steps of the method 500 may be performed by the AMRF system 120 to execute a received access management request, and may be performed as substeps of one or more of the steps of the method 400.

At 501, the AMRF system 120 receives a request from the IAM system 110 and extracts information from the received request. For example, the AMRF system 120 parses the received request to identify information for predetermined fields. The incoming request may be an access management request from the IAM system 110.

At 502, the AMRF system 120 determines whether the received request is a composite request. A composite request may require that a series of tasks be performed to execute the composite request. An example of a composite request may include a request to create a user account on a target system for a new user. In order for the new user to access the target system, the user may need to be added to an active directory for network authentication in order to have rights to access a network to connect to the target system. Also, the user may need access to a shared file system for the target system to store files shared by other users. Accordingly, the series of tasks for the composite request may include adding the new user to the active directory and providing permissions for the appropriate network, and providing permissions for the new user to access the shared file system, and creating a new user account in the target system for the new user. A rule in the knowledge base 214, may specify these tasks that need to be performed for the composite request to be executed.

In an example, the AMRF system 120 includes a rule-based expert system that can determine whether an incoming request from the IAM system 110 is a composite request or another type of access management request. The incoming access management request may be parsed to identify the target system, the operation to be performed (e.g., create user account, modify user account, delete user account, etc.), and a user associated with the request. This parsed information may be stored in the working memory 215 shown in FIG. 2 of the expert system. The inference engine 213 may identify a rule from the knowledge base 214 that is associated with the operation and the target system, and the rule may identify whether the incoming access management request is a composite request based on the operation and the target system. If the incoming access management request is a composite request, the rule may specify a set of tasks to be performed to execute the composite request. According to another example, a machine learning classifier may be used by the expert system of the AMRF system 120 to classify an incoming request as a composite request or another type of request in order to identify incoming composite requests, and a rule may specify the tasks to be performed for an incoming composite request.

At 503, if the incoming access management request is determined to be a composite request, the expert system of the AMRF system 120 generates access management instructions to be executed by one or more the robots 132 for the tasks to be executed for the composite request. The access management instructions are stored in the robot instruction queue 126. For example, the AMRF system 120 creates entries in the table 300 for the access management instructions to be executed. If the incoming access management request is determined not to be a composite request, at 504, the AMRF system 120 generates an access management instruction to be executed by a robot for the incoming access management request, and stores the access management instruction in the robot instruction queue 126. Although not shown, steps 407-411 may be performed as needed for access management instructions created and stored in the robot instruction queue 126.

After a robot executes or attempts to execute an access management instruction from the robot instruction queue 126, the status of the access management instruction from the robot instruction queue 126 is updated, such as described above. In some instances, a robot may attempt to execute an access management instruction, but the execution failed. There may be various causes of a failed execution of an access management instruction by a robot. For example, there may be a connectivity failure resulting in a robot being unable to connect to a target system to execute an access management instruction on the target system. Another cause of a failed execution of an access management instruction by a robot may be due to a programming failure of the robot. A robot may be programmed to execute a task on a target system. A programming failure may include failed execution of a programmed instruction by the robot. A common cause of a programming failure is a changed interface for a target system. For example, a robot may be programmed to mimic operations performed by a human. For example, to create user account on a target system, a system administrator may access a uniform resource locator (URL) for the target system via a browser, and be presented with a login page that includes text boxes for entering a login ID and password. A system administrator may enter a login ID and a password for the system administrator in the text boxes to perform the necessary access management tasks on the target system. A robot may be programmed to mimic these operations of the system administrator. For example, the robot enters the URL of the target system in the browser to access the login page, and the robot is programmed to enter the login ID and password for the system administrator in the text boxes. The robot may be programmed to search for a text box having a particular name in the code, such as the Hypertext Markup Language (HTML), of the login page. If the name of the text box changes for entering the login ID, such as due to a version update of the target system, the robot may not be able to find the text box to enter the login, causing a failed execution of the access management instruction. The robot will need to be re-programmed with the new text box name. Another example of a programming failure may include failing to enter the correct login ID or password of a system administrator. For example, if the password changes, the robot must be re-programmed with the new password. Robots may be automatically re-programmed as is further discussed below.

Figure 6:
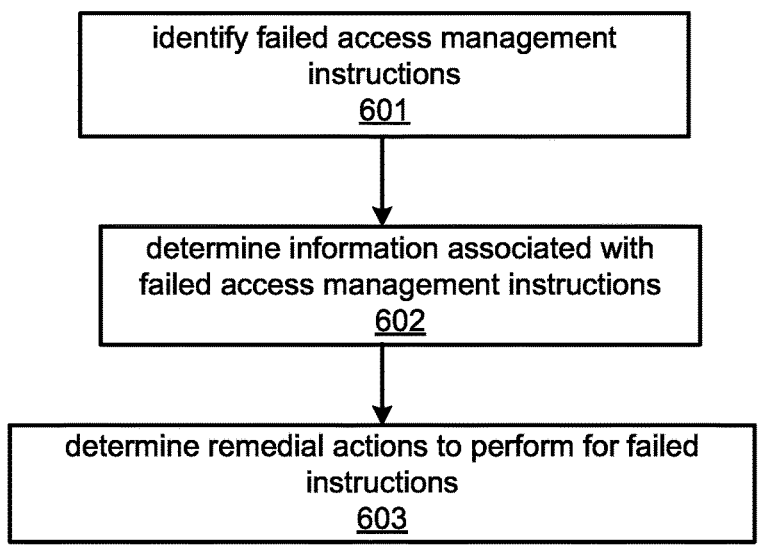

According to an embodiment, the AMRF system 120 may determine a cause of failed execution of an access management instruction in the robot instruction queue 126 and perform a remedial action in response to the failed execution. FIG. 6 shows a method 600. The AMRF system 120 monitors the status of access management instructions that are in the robot instructions queue 126. At 601, the AMRF system 120 identifies failed access management instructions, such as access management instructions that have a status of exception or failed, in the robot instructions queue 126.

At 602, the AMRF system 120 determines information associated with the failed access management instructions. The information associated with a failed access management instruction may include information that can explain, at least partially, the cause of the failed execution. For example, the information may include error messages which may be generated by the target system or another system. For example, if the exception is due to a connectivity error, the robot may receive an error message related to the inability to connect, such as "connection failed". The error message may be logged by the robot and may be provided, for example, in the remarks field, in the table 300 for the access management instruction. In another example, if the login ID or password for the system administrator changed, the robot may receive an error message related to unknown login ID or password and provide the error message in the remarks field.

Other examples of information associated with a failed access management instruction are shown in table 300 in FIG. 3. For example, for a failed attempt to create a new user with the same name, a robot may include information, such as name already exists in the remarks field, or may include information, such as mandatory fields are blank, if mandatory information for executing the instruction is missing. A robot may also identify a step that failed to execute. For example, the robot may be programmed to navigate to a text box on a web page to enter a login ID. If that step failed, such as due to a code change in the web page, the robot may include information identifying the failed navigation step in the remarks field.

At 603, the AMRF system 120 determines remedial actions to perform for the failed instructions in the robot instructions queue 126, and the remedial actions may be determined based on the information associated with the failed access management instructions that is determined at 602. In an example, an expert system of the AMRF system 120 determines the remedial actions. For example, the inference engine 213 may identify a rule from the knowledge base 214 based on the information associated with a failed access management instruction and other information describing the failed access management instruction, and the rule may specify the remedial action to perform. For example, for a network connectivity problem, the rule may specify to send a notification to the help desk system 230, and identify in the notification that a network connectivity problem has occurred for a particular target system.

In another example, a rule may specify a remedial action for a programming failure. For example, the rule may specify to send a notification to the help desk system 230, and include information about the failed instruction. System administrators may access the help desk system 230 to perform remedial actions and/or to execute the failed instructions manually. A robot may be automatically re-programmed in response to a detected programming failure. For example, the help desk system 230 may include a recorder to record manual execution of a failed instruction. For example, if execution failed due to a new user interface at the target system, the recorder may record user operations performed on a browser of system administrator's computer to execute an operation on the new interface of the target system via the browser. The recorded user operations may then be used to program a robot.

Embodiments and examples are described above, and those skilled in the art will be able to make various modifications to the described embodiments and examples without departing from the scope of the embodiments and examples.

What is claimed is:

1. A access management system comprising:
    an identity and access management (IAM) system comprising:
        a central directory data storage storing electronic identities of individuals and credentials of the individuals; and
        an IAM computer to:
            receive a request to perform an access management task on an associated target system;
            determine whether the request is approved;
            in response to determining the request is approved, generate an access management request to perform the access management task based on the received request;
    an access management robot facilitation (AMRF) system comprising:
        a robot instruction queue; and
        an access management robot facilitation computer to:
            receive the access management request from the IAM system and extract information from the access management request;
            generate an access management instruction in the robot instruction queue based on the extracted information;
            determine whether the access management instruction is missing required information;
            obtain the required information from the central directory data storage if the access management instruction is missing the required information, and insert the obtained information in the access management instruction;
            mark the access management instruction in the robot instruction queue as not yet started;
            identify when the access management instruction in the robot instruction queue has failed; and
            determine one or more remedial actions that can be performed for the failed access management instruction based on information associated with the failed access management instruction, wherein the one or more remedial actions comprise automatically reprogramming a robot of a plurality of robots included in a robotic process automation (RPA) system to execute the failed access management instruction based on recorded desktop operations of a system administrator, the desktop operations successfully executing access management tasks associated with the failed access management instruction;
    the robotic process automation (RPA) system comprising:
    the plurality of robots configured to control access to a plurality of target systems that include the associated target system,
    the plurality of robots comprising the robot, wherein the robot is identified as controlling access to the associated target system, the robot including a processor to:
        monitor the robot instruction queue for new access management instructions;
        identify the access management instruction in the robot instruction queue;
        mark the access management instruction in the robot instruction queue as pending;
        execute the access management instruction on the associated target system specified in the access management instruction; and
        update a status of the access management instruction in the robot instruction queue based on the execution of the access management instruction.

2. The access management system of claim 1, wherein the AMRF system transmits the updated status to the IAM system, and the IAM system sends an operation request to the AMRF system to delete the access management instruction from the robot instruction queue.

3. The access management system of claim 1, wherein in response to not obtaining the missing information, the access management robot facilitation computer is to update the status of the access management instruction to failed in the robot instruction queue.

4. The access management system of claim 1, wherein the robot is programmed to perform exception handling in response to identifying a predetermined exception when executing the access management task on the associated target system, and to mark the status of the access management instruction in the robot instruction queue as exception when the predetermined exception is identified.

5. The access management system of claim 4, wherein the access management instruction in the robot instruction queue includes a remarks field, and the robot is programmed to populate the remarks field with a cause of the predetermined exception when the predetermined exception is identified.

6. The access management system of claim 1, wherein the robot updates the status to completed if the execution of the access management instruction is successfully completed; wherein the robot updates the status to failed if the execution of the access management instruction failed; and
wherein the robot updates the status to exception if a predetermined exception is encountered during the execution of the access management task.

7. The access management system of claim 1, wherein the robot is programmed to automate access management tasks on the associated target system.

8. The access management system of claim 7, wherein the access management system tasks include creating, deleting or modifying user accounts on the associated target system.

9. The access management system of claim 1, wherein the access management robot facilitation computer is to:
determine whether the received the access management request is a composite request;
in response to determining that the access management request is a composite request, determining a series of tasks to be performed on the associated target system to execute the composite request; and
generate access management instructions in the robot instruction queue to perform the series of tasks by at least one robot of the RPA system.

10. The access management system of claim 1, wherein the access management robot facilitation computer is to further:
generate an alert fix if no remedial actions are determined for the failed instructions; and
automatically execute the one or more remedial actions if it is determined that the one or more remedial actions can execute the failed instructions.

11. An access management robot facilitation system comprising:
a storage device storing a robot instruction queue; and
an access management robot facilitation computer comprising a processor to:
receive an access management request for an associated target system selected from a plurality of target systems from an identity access management system;
extract information from the received request;
generate an access management instruction in the robot instruction queue based on the extracted information;
determine whether the access management instruction is missing required information;
obtain the required information from a directory of an access management system if the access management instruction is missing the required information;
insert the obtained information in the access management instruction; and
mark the access management instruction in the robot instruction queue as not yet started;
identify, from a plurality of robots controlling access to the plurality of target systems, a robot controlling access to the associated target system, wherein the robot includes a processor that is programmed to:
monitor the robot instruction queue for new access management instructions;
identify the access management instruction in the robot instruction queue;
mark the access management instruction in the robot instruction queue as pending;
execute the access management instruction on the associated target system specified in the access management instruction; and
update a status of the access management instruction in the robot instruction queue based on the execution of the access management instruction;
identify when the robot has failed to execute the access management instruction; and
determine one or more remedial actions that can be performed for the failed access management instruction based on information associated with the failed access management instruction, wherein the one or more remedial actions comprise automatically reprogramming the robot to execute the failed access management instruction based on recorded desktop operations of a system administrator, the desktop operations successfully executing access management tasks associated with the failed access management instruction.

12. The access management robot facilitation system of claim 11, wherein the access management robot facilitation computer is to receive an operation request from the robot to update a status of the access management instruction in the robot instruction queue to pending in response to the robot executing the access management instruction on the associated target system, and the access management robot facilitation computer updates the status to pending.

13. The access management robot facilitation system of claim 12, wherein the access management robot facilitation computer is to further update the status of the access management instruction in the robot instruction queue based on the execution of the automated access management task by the robot in the associated target system.

14. The access management robot facilitation system of claim 13, wherein the further updated status comprises completed if the execution of the automated access management task is successfully completed;
wherein the further updated status comprises failed if the execution of the automated access management task failed; and
wherein the further updated status comprises exception if a predetermined exception is encountered during the execution of the automated access management task.

15. The access management robot facilitation system of claim 11, wherein in response to not obtaining the missing information, the access management robot facilitation computer is to update status of the access management instruction to failed in the robot instruction queue.

16. The access management robot facilitation system of claim 11, wherein the access management instruction in the robot instruction queue includes a remarks field, and the robot is programmed to populate the remarks field with a cause of a predetermined exception if the predetermined exception is encountered during execution of the automated access management task.

17. A computer implemented method to facilitate execution of access management tasks by at least one robot, the method comprising:

receiving an access management request for an associated target system from an identity access management system;

extracting information from the received request;

generating an access management instruction in a robot instruction queue based on the extracted information;

determining whether the access management instruction is missing required information;

obtaining the required information from a central directory of the identity access management system if the access management instruction is missing the required information;

inserting the obtained information in the access management instruction;

marking status of the access management instruction in the robot instruction queue as not yet started;

identifying, from a plurality of robots controlling access to a plurality of target systems, a robot controlling access to the associated target system, wherein the robot includes a processor that is programmed for:

monitoring the robot instruction queue for new access management instructions;

identifying the access management instruction in the robot instruction queue;

marking the access management instruction in the robot instruction queue as pending;

executing the access management instruction on the associated target system specified in the access management instruction; and updating a status of the access management instruction in the robot instruction queue based on the execution of the access management instruction;

identifying when the robot has failed to execute the access management instruction; and determining one or more remedial actions that can be performed for the failed access management instruction based on information associated with the failed access management instruction, wherein the one or more remedial actions comprise automatically reprogramming the robot to execute the failed access management instruction based on recorded desktop operations of a system administrator, the desktop operations successfully executing access management tasks associated with the failed access management instruction.

* * * * *